United States Patent [19]

Haas

[11] 4,382,885
[45] May 10, 1983

[54] METHOD FOR PRODUCING NUCLEAR FUEL

[75] Inventor: Paul A. Haas, Knoxville, Tenn.

[73] Assignee: The United States of America as represented by the United States Department of Energy, Washington, D.C.

[21] Appl. No.: 257,014

[22] Filed: Apr. 24, 1981

[51] Int. Cl.$^3$ .............................................. G21C 3/62
[52] U.S. Cl. .................................. 252/635; 252/634
[58] Field of Search .............................. 252/634, 635

[56] References Cited

U.S. PATENT DOCUMENTS

| 3,082,103 | 3/1963 | Wainer ............................... 252/634 |
| 3,697,441 | 10/1972 | Petit et al. ......................... 252/634 |

FOREIGN PATENT DOCUMENTS 722137 11/1965 Canada ................................ 252/634
786768 6/1968 Canada ................................ 252/634

OTHER PUBLICATIONS

Tiegs et al., "The Sphere-Cal Process . . . ", ORNL/TM-6906, (Sep. 1979).

Primary Examiner—Deborah L. Kyle
Attorney, Agent, or Firm—Edwin D. Grant; Stephen D. Hamel; Richard G. Besha

[57] ABSTRACT

Nuclear fuel is made by contacting an aqueous solution containing an actinide salt with an aqueous solution containing ammonium hydroxide, ammonium oxalate, or oxalic acid in an amount that will react with a fraction of the actinide salt to form a precipitate consisting of the hydroxide or oxalate of the actinide. A slurry consisting of the precipitate and solution containing the unreacted actinide salt is formed into drops which are gelled, calcined, and pressed to form pellets.

8 Claims, 1 Drawing Figure

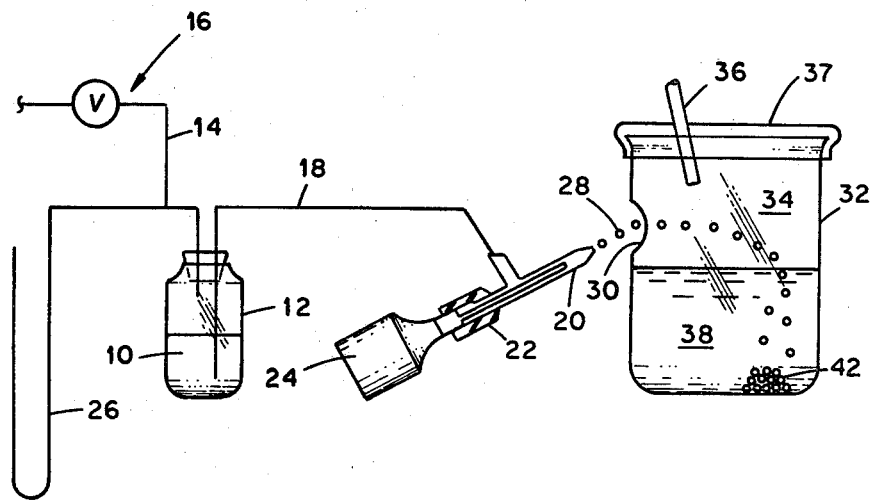

METHOD FOR PRODUCING NUCLEAR FUEL

BACKGROUND OF THE INVENTION

This invention resulted from a contract with the U.S. Department of Energy and relates to a method for forming nuclear fuel.

More particularly, the invention relates to the production of nuclear fuels in pellet form.

Fuel rods for some nuclear reactors are loaded with pellets each formed from sintered spheres made of a fissile material and having diameters in the range of about 100–1000 μm. The so-called microspheres of such nuclear fuel pellets must possess various properties that are difficult to attain, including a specific uniform composition, high density, and the capability of being compacted and sintered in pellets free of cracks and uniform in structure. Preferably microspheres should be dust-free, convenient to handle and feed, and adapted to compact or deform during pellet pressing to provide a structure that does not retain microsphere fragments or voids between the microspheres.

Attempts have been made to form microspheres for use in nuclear fuel pellets by an "external gelation" process which, generally described, utilizes ammonia to precipitate actinide metal salts as hydrated oxides to convert drops containing the salts into solid gels. A successful application of this simple concept is almost impossible. The precipitates are so weak or have such an extreme shell structure that the dried products are fragments, hollow particles, or collapsed shells. Practical external gelation processes depend on the pre-existence of a polymer structure in the drops to be gelled which supports and hardens the solid resulting from reaction with ammonia. One type of polymer structure is provided by the addition of water-soluble organic polymers such as polyvinyl alcohol, methyl cellulose derivatives, and natural gum or starch derivatives. A second additive is often employed to promote or improve the effects of the primary polymer. Another type of polymer structure is a colloidal dispersion of the actinide metal, usually a $ThO_2$ sol. The thoria sols may be either colloidal $ThO_2$ with a small amount of $HNO_3$ as a dispersing agent, or they may be prepared by neutralizing $Th(NO_3)_4$ solution with ammonia and digesting to give a $ThO_2$ sol with a high $NH_4NO_3$ content. Metal oxide sols and organic polymers are also used in combination.

For both the organic and the $ThO_2$ polymers, the feed "broth" concentrations for gelation are carefully selected to give the maximum polymer structure possible without premature solidification. The broths then commonly have a high viscosity up to the point of being difficult to pump and form into drops. Viscosity measurements are commonly used as a control procedure for the feed makeup. Feed broth concentrations are such that a small increase in concentration will result in a large increase in viscosity, that is, gelation. The reaction with ammonia during gelation forms hydrated oxides, thereby leaving less water available to the original polymer present and the polymer sol is changed to a gel. Thus, the gel spheres show both the structure from the gelation of the colloidal component of the broth and the hydrated oxides precipitated by reaction with ammonia.

Tests made with external gelation with both organic polymers and $ThO_2$ sols in feed broths have shown that when spheres are basically $ThO_2$ gel, the dried oxides are very hard and unsuitable for fabrication of pellets. Polyvinyl alcohol polymers also produce hard gel spheres which compact poorly. Some products utilizing methyl cellulose derivatives as the organic polymer are softer and compact better than those with polyvinyl alcohol polymers or $ThO_2$ sols. However, the organic concentrations required to give the softer products result in troublesome feed viscosities and in washing and drying difficulties.

SUMMARY OF THE INVENTION

It is a primary object of this invention to provide an effective method for forming high-quality nuclear fuel pellets of the compacted microsphere type.

Another object of the invention is to provide a process which forms microspheres having the proper density, compactability, and sintering characteristics for use in fabrication of nuclear fuel pellets.

Still another object of the invention is to provide a method by means of which high quality microspheres for nuclear fuel pellets can be formed without using process streams that cause waste disposal problems.

These objects and other advantages are attained by a process which includes as a step thereof the partial precipitation of actinide metals in a feed solution to prepare a fine, well-suspended slurry as a support medium which replaces the conventional organic polymer or $ThO_2$ sol used for this purpose. A preferred process in accordance with the invention comprises the steps of: (1) forming a first solution wherein an actinide salt such as uranyl nitrate, plutonium nitrate or thorium nitrate, or a mixture of these compounds, is dissolved in water; (2) mixing the aforesaid first solution with a second aqueous solution containing a reagent consisting of ammonium hydroxide, ammonium oxalate, oxalic acid, or a mixture of these compounds, the amount of the reagent or reagents in this second solution being sufficient to react with a first portion of the actinide salt or salts in the first solution to form a precipitate, and a second portion of the actinide salt or salts being left dissolved in the resultant solution; (3) screening from the slurry formed by the aforesaid precipitate and the first and second solutions any solids exceeding a predetermined size; (4) passing the screened slurry through a nozzle to form drops having a predetermined maximum size; (5) passing the drops through an atmosphere of ammonia gas and into a concentrated aqueous solution of ammonium hydroxide to gel the drop into solidified spheres; (6) washing the spheres with water or dilute solutions to remove occluded materials therefrom; (7) drying the washed spheres in an oven at a temperature in the range of about 150°–400° C.; (8) calcining the dried spheres at a temperature in the range of about 400°–800° C. in a 96% argon-4% hydrogen atmosphere for four hours followed by cooling to room temperature in an atmosphere of carbon dioxide; (9) pressing the calcined spheres into pellets; and (10) sintering the pellets at a temperature of 1450° to 1700° C. in a 96% argon-4% hydrogen atmosphere for four hours followed by cooling to room temperature in an atmosphere of argon or carbon dioxide.

DESCRIPTION OF THE DRAWING

The single drawing is a diagrammatic representation of apparatus used for forming the microspheres in tests run to demonstrate the efficacy of the invention.

DETAILED DESCRIPTION

The composition and the sintering characteristics of actinide oxide microspheres are controlling requirements for their use in nuclear fuel pellets. Experimental results show that high-strength, hard microspheres which have a glassy appearance and which are brittle form pellets with an unacceptable low density and high porosity. Microspheres having a grainy structure and lower crush strength generally have better sintering characteristics. Microspheres having a bulk density of 1.2 to 2.5 g/cm$^3$ have been found suitable for use in pressing fuel pellets.

In a previously known external gelation process for forming fuel pellet microspheres, drops consisting of an actinide metal nitrate dissolved in water are gelled (or solidified) by passage through (1) ammonia gas, which forms a cohesive gelled layer at the surface of each drop, and (2) an aqueous solution of ammonium hydroxide, which reacts with the actinide metal nitrate in the liquid under the aforesaid layer to complete the gelation of the drops. For example, in accordance with the previously known procedure, gelled spheres containing thorium hydroxide would be obtained by forming an aqueous solution of thorium nitrate and passing drops of this solution through ammonia and an aqueous solution of ammonium hydroxide. The gelled spheres thus obtained would then be calcined to convert the thorium hydroxide to thorium dioxide spheres for use in forming sintered fuel pellets. However, it has been found that thorium dioxide microspheres formed in this manner do not have the proper characteristics for forming good sintered fuel pellets. Using the same type of aqueous thorium nitrate solution that is used in the above-described process as a starting material, the process of this invention produces thorium oxide microspheres that have the qualities required for fuel pellet manufacture. In a subsequent part of this specification, examples are presented to illustrate specific types of fuel pellets that can be made by the process of this invention. However, persons skilled in the art of nuclear fuel manufacture will recognize that the process of the invention can be used to make other fuel pellet compositions, and that variations can be made in the presented examples without departing from the principles on which the process is based.

The apparatus illustrated in the accompanying drawing was used for forming microspheres in each of the specific examples described hereinafter. The feed slurry 10 prepared for each example was held in a feed vessel 12 pressurized by air from a conduit 14 connected to a regulator generally designated by reference number 16. A second conduit 18 connected vessel 12 with a nozzle 20 vibrated by a vibrator 24. Air pressure in vessel 12 was indicated by a manometer 26 and was adjusted to give the desired trajectory to drops 28 of the feed slurry discharged from nozzle 20 and passed through a hole 30 in the side of a beaker 32. Drops 28 were passed through an atmosphere of ammonia gas 34 supplied to beaker 32 at a rate of 2000 cm$^3$/min through a conduit 36 extended through an aperture in the beaker cover 37, the brief exposure of the drops to this atmosphere gelling the outermost portion of each drop. Gelation of the drops was completed in an aqueous solution 38 of 3.0 to 15 molar ammonium hydroxide with ammonium nitrate added for some tests. A few drops of Span 80, a surfactant, were added in some cases to minimize coalescence of drops.

Best results for drop formation were obtained when a jet was discharged from nozzle 20 at a velocity in the range of 50 to 150 cm/sec. Lower velocities did not carry the drops into the beaker properly while higher velocities carried the drops too far or impacted the drops too hard on the surface of solution 38. Breakup of a jet tends to occur at lengths of 4 to 5 times the jet diameter, and each fragment of the jet is formed into a spherical drop with a diameter of about twice the jet diameter. Regularity of jet breakup and uniformity of drop diameter are promoted by imposing a vibration on the jet with a frequency near the natural frequency of jet formation. Drop formation was observed with a stroboscopic light, and the frequency of vibration of vibrator 24 was adjusted to give the best drop formation appearance with spaces between the drops slightly greater than the 0.35 mm diameter. The following data for a 0.35 mm nozzle orifice and a jet velocity of 120 cm/sec are given as an illustration: jet diameter=same as nozzle orifice diameter; cross-sectional area of jet=0.096 mm$^2$; jet flow=6.9 cm$^3$/min; volume of 0.70 mm diameter drop=0.180·10$^{-3}$ cm$^3$; drop formation frequency=6.9/0.180·10$^{-3}$=38,000 drops/min; vibration frequency=640 cycles/sec.

Gel microspheres 42 collected in beaker 32 were allowed to age in the gelation liquid for 30 to 100 minutes and were then placed on a 40 mesh screen in a wash vessel and washed with 0.3 to 0.5 molar ammonia hydroxide solution. Drying was usually done in the same screen-equipped vessel, water in the gel microspheres being vaporized at a rate determined by the rate at which heat was supplied for this operation. With steam drying, water was evaporated at 100° C. with heat transferred from an oven at a higher temperature (usually 225° to 250° C.) to the microspheres in an atmosphere of their own vapor. The individual spheres remained at 100° C. for varying times, from a few minutes for a small sample such as a monolayer to more than 24 hours for the center of four liter batches. With air drying, water was evaporated at the wet-bulb temperature of a large flow of dry air. This temperature can be as low as 14° C. for air supplied at room temperature and as high as 20° C. for warm or hot air at 60° to 80° C. when the air is heated by low-pressure steam in a heat exchanger.

EXAMPLE I

A solution containing 1.08 moles of uranium as uranyl nitrate and 0.36 mole of cerium as cerous nitrate in 0.55 liter of water was thoroughly mixed with an aqueous solution of ammonium hydroxide at 0° C. Cerium nitrate may be used as a substitute for plutonium nitrate in nuclear fuel research because the chemical and thermal decomposition behavior of cerium nitrate is similar to that of plutonium nitrate. The final volume and amount of ammonium hydroxide added to the uranyl nitrate and cerium nitrate solution were calculated to give the following relationships: U/Ce=3 mole/mole; U+Ce=4.05 N; NO$_3^-$=4.31 N; NH$_4^+$=2.3 N. A yellow slurry was obtained consisting of a precipitate of hydrated uranium and cerium oxides and liquid containing unreacted uranyl nitrate and cerium nitrate. The slurry was initially very fluid and thickened with continued agitation. After 1.5 hours, the slurry had a pH of 2.85 and the appearance of a thick yellow paint. The slurry was then fed through a nozzle three 280 micron diameter holes for forming jets, the nozzle being vibrated to form 120,000 drops per minute. The drops were solidified by means of the ammonia gas atmosphere and concentrated ammonium hydroxide solution in beaker 32 described hereinbefore. The resultant wet spheres consisting of a uranium oxide-cerium oxide gel and having a diameter of about 650 microns were washed with water and dried in an oven at 225° C. to give 290 g of dried spheres having an average diameter of 450 microns and a bulk density of 1.25 g/cm$^3$. The dried spheres were calcined by maintaining them at a temperature of 600° C. for four hours in a 96% argon-4% hydrogen atmosphere and then cooling them to room temperature in an atmosphere of carbon dioxide. The calcined spheres were pressed into pellets at 241 Mpa (35K psi), sintered at 1450° C. for four hours in a 96% argon-4% hydrogen atmosphere, and cooled in argon or carbon dioxide. The spheres formed a sintered pellet having a good microstructure and good density of 92% of the theoretical density for (U, Ce)O$_2$.

EXAMPLE II

An aqueous solution containing uranyl nitrate, thorium nitrate, and ammonium nitrate was thoroughly mixed with a hot aqueous solution of ammonium oxalate. From the amounts mixed, the slurry concentrations were: U/Th=3.0 mole/mole; U+Th=4.24 N; $NH_4^+$=2.40 N; $NO_3^-$=4.38 N; and $C_2O_4^{-2}$=1.11 N. After one hour of mixing, the obtained yellow slurry consisting of a mixed precipitate of uranium and thorium and liquid containing unreacted uranyl nitrate and thorium nitrate had the appearance of thick yellow paint and a pH of 2.70. The slurry was discharged from a nozzle having a single 480 μm diameter hole to form 27,000 drops per minute. The drops were solidified in ammonia gas and concentrated ammonium hydroxide as described hereinbefore. The resultant wet spheres consisting of a mixed gel of uranium and thorium and having a diameter of about 950 μm were washed with water and dried by exposure to warm air followed by heating at 225° C. in an oven. The diameter of the dried spheres was found to be 550 μm. For the same sinterability test conditions specified in Example I, sintered pellets having a good microstructure and a density of 75% of theoretical for (U, Th)O$_2$ were formed. A higher sintering temperature than 1450° C. would be expected to produce pellets of higher density as ThO$_2$ pellets generally require sintering temperatures higher than that value.

EXAMPLE III

A mixture of eighty grams of ammonium oxalate in 170 cm$^3$ of hot water was thoroughly agitated in a one-liter beaker. A solution containing ammonium nitrate, thorium nitrate, and uranyl nitrate (1.95 M Th, 0.65 M U, 7.8 M $NO_3^-$) at a temperature of 2° C. was rapidly added to the ammonium oxalate solution with stirring, forming a stable suspension with the appearance and viscosity of thin yellow paint. From the amounts mixed, the slurry concentrations were: 4.54 N $Th_4^+$; 0.76 N $UO_2^{2+}$; 2.75 N $NH_4^+$; 4.57 N $NO_3^-$; and 2.75 N $C_2O_4^{-2}$. The suspension was passed through a 120 mesh screen (125 micrometer openings) without any retention of solids and was then fed to a vibrated three-hole feeder (280 μm holes) to form 135,000 drops per minute. The drops were solidified in ammonia gas and concentrated NH$_4$OH solution, and the gel spheres (630 μm diameter) thus obtained were washed with water and dried in an oven at 225° C. to form 150 grams of dried gel spheres (350 μm diameter, 1.49 g/cm$^3$ bulk density). For the same sinterability test conditions presented in Example I, pellets were formed which had a good microstructure and a density of 80% of theoretical density for (Th, U)O$_2$. As ThO$_2$ pellets generally require a sintering temperature higher than 1450° C., a higher pellet density would be expected with sintering at a higher temperature than that used in the test.

EXAMPLE IV

Uranyl nitrate in an aqueous solution was partially precipitated by mixing the solution with an aqueous solution of ammonium hydroxide to form a slurry having a pH of 2.41. From the amounts mixed, the slurry concentrations were: 3.52 N $UO_2^{2+}$; 2.73 N $NH_4^+$; and 3.89 N $NO_3^-$. The slurry was formed into drops by discharging it from a vibrating nozzle, and these drops were solidified by contact with ammonia gas and a concentrated aqueous solution of ammonium hydroxide. The gel spheres were washed with water, dried, calcined, and formed into sintered pellets having a good microstructure and a density of 91% of the theoretical density for UO$_2$.

EXAMPLE V

Thorium nitrate in an aqueous solution (5.7 N Th(NO$_3$)$_2$) was partially precipitated by mixing the solution with an aqueous solution of ammonium hydroxide and ammonium oxalate to form a slurry having a pH of 2.02. From the amounts mixed, the slurry concentrations were: 5.7 N $Th^{+4}$; 3.33 N $NH_4^+$; 5.89 N $NO_3^-$; and 1.43 N $C_2O_4^{-2}$. The slurry was formed into drops by discharging it from a vibrating nozzle, and these drops were solidified by contact with ammonia gas and a concentrated solution of ammonium hydroxide. The gel spheres were washed with water, dried, and the calcined ThO$_2$ gel particles showed the oxalate structure known to be preferred for the preparation of pellets.

A slurry prepared by the partial precipitation process of this invention for use in forming drops to be solidified by external gelation is a two phase system and is not at thermodynamic equilibrium. Therefore, the properties of such slurries are not fixed by composition but are also dependent on mixing conditions for the slurries, including temperature, degree of agitation, and addition procedures. Feed variables for drop formation interact and thus it is not possible to state simple optimal values for the different factors involved. Higher slurry viscosities tend to result in less smashing and cracking of gel spheres during the pellet-forming procedures, but they can also cause difficulties in drop formation. If a slurry is too thick after mixing and digestion, it has been found that large additions of water are required to reduce viscosity, and the gelation results after such thinning are usually poor. The pH of a slurry is dependent on its acid deficiency and the time lapsed after mixing. The best feed slurries were found to have pH values in the range of 2.4 to 2.8, but pH alone is not a sufficient feed evaluation criterion. In order to obtain these pH values, either the initial Th-U-Pu solution is acid deficient or NH$_4$OH is added for slurry preparation. A high fraction of the metal nitrate remaining in solution after the partial precipitation tended to give low pH values, unpredictable viscosities, and excessive cracking or smashing of gel spheres. A low fraction of the metal nitrate remaining in solution after the partial precipitation tended to give high pH values and incomplete dispersion or suspension of the precipitation solids. For preparation of spheres containing only uranium, the best results were obtained with an acid deficient uranium-type precipitation (no oxalate) as the oxalate precipitates gave excessive viscosities, low pH values, and glassy shell structures in the gel spheres. For preparation of spheres containing thorium, some oxalate precipitation is necessary to improve the ceramic properties of the product and to give the optimum combination of degree of precipitation and pH. Use of an acid-deficient solution with thorium provides standard external gelation for a thorium dioxide sol and produces hard, glossy, spheres with poor ceramic properties. Mixing of hot solutions appears to favor crystal growth and undesirable separation of solids from supernate. Cooling to remove the heat of neutralization and thereby limit digestion temperature may improve results.

The partial precipitation slurries generally require 30 to 120 minutes of digestion with good agitation to approach constant viscosities. The nozzles or orifices used for forming drops from the slurries must be protected from any large particles of precipitate by use of a screen with openings about ⅓ the size of the nozzle openings or feed orifices. The jet velocities from nozzles or orifices must be controlled to provide the proper trajectory of drops through the ammonia gas. It appears preferable to use a batch makeup of a partial precipitation slurry with pumping through a screen to a tank feeding the slurry to a nozzle or orifice, and with air pressure being applied to the feed tank to control the velocity of the drop-forming jets.

The partial precipitation process operations of this invention are relatively simple compared to many other gel sphere-forming processes. The absence of organic solutes from the feed and the absence of an organic forming or wash liquid eliminate many complexities of other processes. Since the forming liquid and the wash solution used in the process of this invention are both aqueous solutions containing ammonium hydroxide, separation of gel spheres to eliminate transfers of liquid is not necessary.

A combined gelation chamber and continuous washer with discharge of a slurry of spheres in wash solution are proposed for process scale-up. The continuous washer would use a countercurrent flow of wash through a moving or packed bed to make efficient use of wash solution and to minimize chemical concentration shock effect on spheres. Spheres from the bottom of a packed bed would be carried into a fluidized bed which allows a continuous, controlled removal of washed spheres.

It will be recognized that modifications can be made in the examples presented hereinabove without departing from the principles of the invention. For example, oxalic acid can be used instead of ammonium oxalate to form partial precipitation slurries containing thorium.

I claim:

1. A method for forming nuclear fuel comprising:
   forming a solution wherein an actinide salt is dissolved in water;
   contacting said solution with an amount of reagent sufficient to react with a first portion of said actinide salt in said solution to form a precipitate while leaving a second portion of said actinide salt dissolved in said solution;
   forming drops comprising said precipitate and the solution containing the dissolved second portion of said actinide salt;
   contacting said drops with ammonia gas and ammonium hydroxide in sequence to convert them to gelled spheres;
   washing, drying, and calcining said gelled spheres; and
   forming the calcined spheres into sintered nuclear fuel pellets.

2. The method of claim 1 wherein said solution contains uranyl nitrate and is contacted with a reagent selected from the group consisting of ammonium hydroxide, ammonium oxalate, oxalic acid, and mixtures thereof.

3. The method of claim 1 wherein said solution contains uranyl nitrate and the reagent is ammonium hydroxide.

4. The method of claim 1 wherein said solution contains uranyl nitrate and the reagent is a mixture of ammonium hydroxide and ammonium oxalate.

5. The method of claim 1 wherein said solution contains uranyl nitrate and thorium nitrate and the reagent is a mixture of ammonium hydroxide and ammonium oxalate.

6. The method of claim 1 wherein said solution contains uranyl nitrate and plutonium nitrate and the reagent is ammonium hydroxide.

7. The method of claim 1 wherein said solution contains thorium nitrate and the reagent is a mixture of ammonium hydroxide and ammonium oxalate.

8. The method of claim 1 wherein said fissile metal salt is selected from the group consisting of uranyl nitrate, plutonium nitrate, thorium nitrate, and mixtures thereof, and said reagent is selected from the group consisting of ammonium hydroxide, ammonium oxalate, oxalic acid, and mixtures thereof.

* * * * *